SWITCHING APPARATUS HAVING A 4RC TIME CONSTANT

Filed June 12, 1967

INVENTOR.
ADRIAN J. MOSES

BY [signature]

ATTORNEY

United States Patent Office 3,539,838
Patented Nov. 10, 1970

3,539,838
SWITCHING APPARATUS HAVING A 4 RC TIME CONSTANT

Adrian J. Moses, Rush City, Minn., assignor to Honeywell Inc., Minneapolis, Minn., a corporation of Delaware Filed June 12, 1967, Ser. No. 645,386
Int. Cl. H03k *17/28, 5/00;* G06g *7/18*
U.S. Cl. 307—293 6 Claims

ABSTRACT OF THE DISCLOSURE

A circuit for providing an amplitude lag function or a high pass function wherein the time constant of the lag or high pass is 4RC.

This invention pertains generally to electronic circuits and more specifically to a circuit which is useful as an alternating signal amplitude lag network or as a high pass filter.

The prior art is replete with signal conversion circuitry for producing amplitude lag or for use as high pass filters. One example is a copending application of mine, Ser. No. 377,007 filed June 22, 1964 and assigned to the same assignee as the present invention. However, even though circuitry such as my above mentioned application can be successfully constructed as part of integrated circuitry, the capacitors form a sizable portion of the circuit. Therefore, any means of reducing the size of the capacitors for a given time constant will provide a useful addition to the art. The present invention uses a capacitor resistor combination such that the time constant of the circuit is four times the time constant to be expected from the circuit. Thus, for a given time constant the size of the capacitor can be reduced by a factor of four, thus resulting in a significant saving in the size of the integrated circuit. While for some embodiments an additional capacitor is utilized in the circuit, the size of this capacitor is substantially smaller than the main capacitor and requires only a small amount of additional space.

It is theerfore an object of this invention to provide improved signal conversion circuitry which is simpler, cheaper and requires less space than the prior art.

Figure 2A:
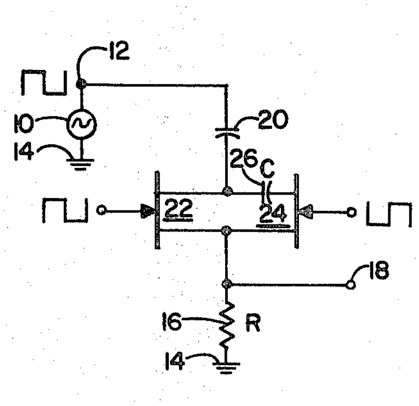
Figure 1:
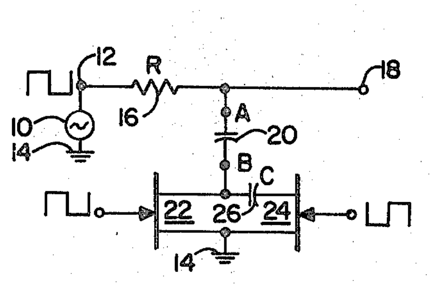
Figure 3:
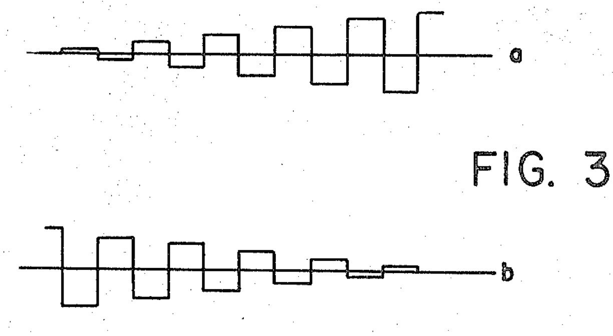
Figure 4:
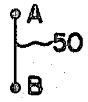

Other objects and advantages of the present invention will be apparent from the reading of the specification and appended claims in conjunction with the drawings wherein:

FIG. 1 is a schematic of an amplitude lag version of the circuit;

FIGS. 2A and B are two different embodiments of the circuit for use as a high pass filter;

FIG. 3 illustrates wave forms of the output signals obtained from FIGS. 1 and 2; and FIG. 4 is a circuit component replacement for FIG. 1.

In FIG. 1 an alternating signal source 10 is connected between an input terminal 12 and ground or reference potential 14. A resistance means or other impedance means (R) 16 is connected between input 12 and an output terminal means 18. A coupling means or capacitor 20 is connected between output 18 and a source of a field effect transistor means or switch means generally designated as 22. The upper and lower electrodes of capacitor 20 are further connected respectively to terminals A and B. For convenience, further references to field effect transistors or switch means will be abbreviated by the letters FET. The drain of FET 22 is connected to reference potential 14 and also to a drain of an FET generally designated as 24. The two sources of FET'S 22 and 24 are connected by two electrodes of a capacitance means (C) 26. The gates of FET's 22 and 24 are connected to a source (not shown) of oppositely phased gating signals of the same frequency as supplied by signal source 10.

All the components of FIG. 1 appear in FIG. 2A with the same reference designation. Further, the components 20–26 are connected in the same manner with oppositely phased gating signals being applied to the FET's 22 and 24. The FIG. 2A is changed, however, in that the input 12, connected to source 10, is connected directly to the coupling capacitor 20 instead of being connected to the capacitor 20 through a resistor 16. A further change is that the resistor 16 is connected between the drains of the FET's and ground instead of the direct connection previously found. The remaining change is that the output 18 is connected to the drain terminals of the FET's rather than the coupling capacitor.

As will be noted, however, the signal is still applied through the resistance means in both cases to the series circuit of the coupling capacitor and the FET's or switches 22 and 24.

Figure 2B:
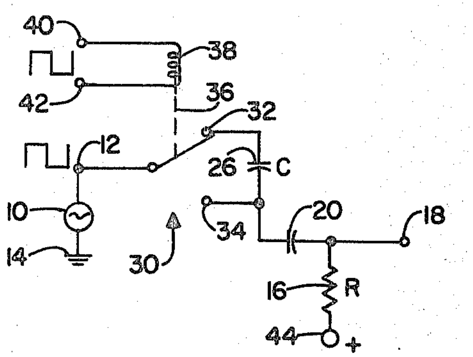

In FIG. 2B, the identical components that appear in FIG. 1 are again given the same number. The circuit could easily have been shown using exactly the same components but was changed slightly to show that the FET's 22 and 24 can easily be replaced by a switch generally designated as 30 which has its common contact connected to terminal 12 and a movable contact alternating between contacts 32 and 34. The capacitor 26 is connected between the contacts 32 and 34. The movable contact of switch 30 is operated by a means shown as dash line 36 which magnetically or physically connects the movable contact to a coil 38 which is connected between terminals 40 and 42. A signal is applied between terminals 40 and 42 which in the embodiment shown is the same frequency as that supplied by source 10. A coupling capacitor 20 is connected between contact 34 and output 18 while resistor 16 is connected between output 18 and a source of positive reference potential 44.

A careful comparison of FIGS. 1 and 2B will show that the two circuits are nearly identical with the difference being that in FIG. 1 the input signal is applied to resistor 16 and the drains of FET's 22 and 24 are connected to reference potential 14 while in FIG. 2B, the source 10 is supplied to the point in the circuit which is the equivalent of the drains of FET's 22 and 24 and reference potential 44 is applied to the resistor 16.

FIG. 3*a* illustrates the wave form obtained from the circuit of FIG. 1 while FIG. 3*b* illustrates the wave form obtainable from FIGS. 2A and 2B.

Thus, it can be easily determined that the same circuit as shown in FIGS. 1 and 2B will provide two dissimilar outputs depending merely upon the application of the input signal and the reference point 14 or 44.

FIG. 4 shows a wire or coupling means 50 connected between terminals A and B for use in modifying the circuit of FIG. 1 by replacing the capacitor 20 with a short.

OPERATION

As previously stated, FIG. 1 is an amplitude lag circuit and if an input signal such as shown adjacent terminal 12 is suddenly supplied to the circuit by source 10, the amplitude of the signal appearing at output terminal 18 will slowly rise as shown in FIG. 3*a*.

The FET's illustrated in this application are the conventional FET's which are normally ON and will be turned OFF with a negative signal applied at the gate with respect to the drain. It is realized that there are many other types of transistors, some of which are normally OFF and some of which will turn OFF with a positive signal. It is within the realm of this invention to include not only these other types of FET's but all types of semiconductor switches and other switching means such as shown in FIG. 2B.

The theory of operation, or in other words why a 4RC time constant is obtained, is not known. However, considerable testing has been completed to establish that in a fact 4RC time constant does occur. Further, considerable thought has been applied to the theory of operation problem with no explanatory results. Therefore, the following operation sequence describes what appears to happen from the testing results rather than why it occurs.

During the first half cycle of operation when terminal 12 goes positive with respect to ground, FET 22 is ON while FET 24 is OFF. Thus, capacitor 20 is connected to ground 14 and receives a charge. This charge is quite small compared to total capacity and appears as a small positive amplitude output signal at terminal 18. On the next half cycle, point A is driven negative and the capacitors 20 and 26 are connected in series. Capacitor 26 is substantially larger than capacitor 20 and may be capable of receiving a charge of 10 or more times the capacity of capacitor 20. The capacitor 20 will discharge into capacitor 26 when the two of them are connected in series between point A and ground 14. On the next half cycle, the capacitor 20 will again charge in the positive direction and since it did not discharge all of its charge into capacitor 26, will be charged somewhat more positive on this half cycle than previously. In the fourth half cycle, capacitor 26 is again charged somewhat further resulting in a larger voltage drop thereacross. Thus, as shown in FIG. 3*a*, the output signal obtained at 18 increases in amplitude as a function of time. The increase is in accordance with a time constant curve wherein the time constant is set forth by the equation $E=4RC$. In this equation R is the resistor 16, C is the capacitor 26 and E is the amplitude of the output signal. As is realized by those skilled in the art, this equation is related to the fact that one time constant is the time that it takes a capacitor to charge to 63% of the value of the applied voltage. The 63% is more accurately described as $(1-1/e)$ 100 where $e$ is epsilon.

In FIG. 2A transistor 22 is ON when terminal 12 is positive and thus the coupling capacitor 20 is connected in series with resistor 16 on the positive half cycle. Thus, since capacitor 20 has not had time to recharge, the full input voltage will appear across resistor 16 and will be applied to output terminal 18. This is shown at the start of the wave form shown in FIG. 3B. On the next half cycle, capacitors 20 and 26 are placed in the series with resistor 16, while terminal 12 is negative. On this half cycle FET 22 is OFF while FET 24 is ON. The coupling capacitor 20 transfers its charge to capacitor 26 and a lesser portion of the signal supplied from source 10 is applied across resistor 16 than on the previous half cycle. In each succeeding half cycle, capacitor 26 charges further until the voltage across capacitor 26 equals the peak-to-peak voltage of the signal supplied between ground 14 and terminal 12. At this point the voltage obtained at output 18 is an insignificantly small amplitude alternating signal. As with FIG. 1, the time constant of this circuit is 4RC and is the time necessary for the output waveform to fall from its original peak-to-peak amplitude to 37% of its original value.

FIG. 2B operates in essentially the same fashion as FIG. 2A since the input signal from source 10 is still supplied through coupling capacitor 20 and alternately through capacitor 26 and resistor 16 with the output being taken across resistor 16. Thus, further explanation will not be provided.

FIG. 4 illustrates that the coupling means or capacitor 20 of FIG. 1 and actually of the rest of the figures can be replaced by a short circuit or wire 50. The only change is that the top half of the wave form of FIG. 3 will be eliminated since every positive half cycle of the input signal will be shorted directly to ground. Eventually, the voltage across capacitor 26 will be the same as the peak voltage of the signal applied to terminal 12 with respect to ground 14. However, this circuit even with the short circuit 50 placed between points A and B has a 4RC time constant.

Similarly, the short 50 can be used to replace the capacitor 20 in FIGS. 2A and 2B to obtain similar results in that only ½ of the signal is involved in the time constant output. Thus, referring to FIG. 2A, if capacitor 20 were replaced with wire 50, each positive half cycle of the signal would be applied directly to output 18. However the negative half cycle would be initially applied and would eventually reduce to zero and the output would thus remain a signal which changes in amplitude between ground and the positive value of the input signal.

While several embodiments of the present invention have been shown, it will be obvious to those skilled in the art that many modifications may be made and still fall within the scope of the invention which involves the use of a network which has alternate paths between two terminals such as point A and the drain of the FET's, one of which paths includes a capacitance C wherein an alternating signal is applied through a resistance R across these two terminals and an output signal is obtained from one of the terminals. The output varying in amplitude is a function of the time constant of 4RC.

I therefore wish to be limited not by the scope of the specification or drawings but only by the scope of the appended claims wherein I claim:

1. Signal conversion circuitry comprising, in combination:

input means for receiving an input signal of a given frequency;

output means for supplying an output signal the amplitude of which lags the input signal;

resistance means connected between said input means and said output means;

capacitance means including first and second electrodes;

coupling means connected between said output means and said capacitance means;

means for supplying a switching signal to said switch means for alternately connecting said first and second electrodes to said reference potential means at said given frequency, each electrode being connected to said reference potential means for substantially one-half cycle of said given frequency.

2. Apparatus as claimed in claim 1 wherein said coupling means is a capacitor.

3. Alternating signal conversion circuitry comprising in combination:

capacitance means (C) including at least two electrodes;

first terminal means for supplying a reference potential;

second terminal means for supplying an alternating input first signal with respect to said first terminal means;

third terminal means for providing an output alternating signal with respect to said first terminal means whose amplitude varies as a function of a 4RC time constant after a step change in the amplitude of the alternating input signal;

switch means connected to said capacitance means and to one of said first, second and third terminal means;

means for supplying a second signal to said switch means for alternately connecting first one and then the other electrode of said capacitance means to said one of said first, second and third terminal means;

Resistance means (R) connected between said third terminal means and another of said first, second and third terminal means; and coupling means connected between one electrode of said capacitance means and the remaining one of said first, second and third terminal means.

4. Apparatus as defined in claim 3 wherein said coupling means is a capacitor whose capacity is much smaller than that of said capacitance means (C).

5. Apparatus of the class described comprising in combination:

a network having first and second terminals;

means including driven switch means and capacitance means (C) for consecutively completing either of two alternate circuits between said terminals wherein one of said circuits includes capacitance means;

means for aplying a driving first signal to said driven switch means;

means including resistance means (R) and a reference point for applying an alternating input second signal between said terminals; and means for taking output signals from between one of said terminals and said reference point, the output signal changing as a function of a 4RC time constance with respect to a change in the amplitude of the input second signal.

6. Apparatus as claimed in claim 5 wherein each of the alternate circuits includes a coupling capacitor and the switch means operates at the frequency of the alternating input signal.

References Cited

UNITED STATES PATENTS

| | | | |
|---|---|---|---|
| 2,676,262 | 4/54 | Hugenholtz | 328—155 XR |
| 2,822,987 | 2/58 | Donovan | 328—127 XR |

DONALD D. FORRER, Primary Examiner

J. ZAZWORSKY, Assistant Examiner

U.S. Cl. X.R.

307—240, 246, 264, 304; 328—127